United States Patent [19]

Shofner et al.

[11] 4,343,637

[45] Aug. 10, 1982

[54] METHOD AND APPARATUS FOR MONITORING THE DIAMETER OF FIBERS

[75] Inventors: Frederick M. Shofner, Knoxville, Tenn.; Neil E. Greene, Granville; Terry J. Hanna, Newark, both of Ohio

[73] Assignee: Owens-Corning Fiberglas Corporation, Toledo, Ohio

[21] Appl. No.: 178,269

[22] Filed: Aug. 15, 1980

[51] Int. Cl.³ ............................................. C03B 37/025
[52] U.S. Cl. ........................................ 65/2; 65/10.1; 65/29; 242/18 G; 242/42; 356/73.1
[58] Field of Search ............................. 65/10.1, 2, 29; 242/18 G, 42; 356/73.1

[56] References Cited

U.S. PATENT DOCUMENTS

| | | | |
|---|---|---|---|
| 3,471,278 | 10/1969 | Greim | 65/2 |
| 3,879,128 | 4/1975 | Presby | 65/2 X |
| 4,046,536 | 9/1977 | Smithgall | 65/2 |
| 4,280,827 | 7/1981 | Murphy et al. | 65/29 X |

Primary Examiner—Robert L. Lindsay, Jr.
Attorney, Agent, or Firm—Ronald C. Hudgens; Patrick P. Pacella; Ronald E. Champion

[57] ABSTRACT

A method and apparatus for monitoring the average diameter of a plurality of glass fibers, comprising illuminating the fibers with electromagnetic radiation, sensing radiation scattered by the fibers and generating a signal responsive to the amount of radiation sensed as an indication of the average diameter of the fibers; such signal can be used for measurement and/or control of the fiber producing process.

16 Claims, 8 Drawing Figures

METHOD AND APPARATUS FOR MONITORING THE DIAMETER OF FIBERS

BACKGROUND OF THE INVENTION

This invention relates to the production of continuous glass fibers, e.g., fibers made by melting particulate batch ingredients or minerals including basalt and the like, and, more particularly, to a method and apparatus for monitoring the average diameter of one or more of such fibers and for controlling the fiber drawing process to maintain the average diameter at a predetermined magnitude.

It is intended that the term "scattered," as used herein, denotes forward scattering, backscattering and right angle scattering of the incident radiation.

It is well known in the art that continuous glass fibers can be produced by attenuating a plurality of streams of molten glass into fibers, collecting the fibers into a strand and winding the strand into a package for subsequent use in manufacturing various products. The molten glass flows from a furnace and through a forehearth into a feeder or bushing which has a plurality of orifices formed therein. The molten glass flows from the orifices as streams which are pulled downwardly at a high rate of speed for attenuation into fibers. A plurality of the attenuated fibers are then gathered together into a strand, coated with a sizing and wound onto a collection tube on a winder collet.

The prior art has employed various systems to control the rotational speed of the winder collet in an attempt to maintain a uniform rate of attenuation and hence produce fibers which are closely similar in diameter and which have a uniform diameter throughout their length. The diameter of a package gradually increases as the strand is wound onto the collection tube; therefore, the rotational speed of the collet must be simultaneously decreased in order to maintain a constant rate of attenuation. Roberson, U.S. Pat. No. 3,265,476, discloses varying the winding speed at a programmed or patterned rate so that the pull speed or strand speed is approximately constant. An alternative method of controlling fiber diameter is disclosed in Roberson, U.S. Pat. No. 3,126,268, in which the set point temperature of the bushing is varied at a programmed or patterned rate to compensate for the increasing winding speed as the package is being built.

While such control systems give satisfactory results and represent a marked improvement over the control systems previously known in the art, we have now discovered that even more uniform fibers can be produced by utilizing means for monitoring the diameter of the fibers being produced and controlling one or more of the fiber forming factors, such as the set point temperature of the bushing, the winding speed of the collet or the environment beneath the bushing. If fibers having closely similar diameters and uniform diameters throughout their length were produced, the strand yardage per pound of glass supplied from the feeder, generally referred to as yardage, would be consistently uniform, thus promoting consumer reliance upon the product quality when strand or fiber diameter or weight per unit length is specified. In the prior art systems, generally, the pull speed or linear strand speed was not constant enough to provide fibers that have closely similar diameters and uniform diameters throughout their lengths. Even if such systems did accurately control the speed, one of the other myriad of interrelated factors that affect the fiber forming process may have changed, thus making the speed set by the controller improper and resulting in fibers that are not consistent with the desired specifications. For example, the molten glass head within the bushing must remain constant to achieve a constant flow rate through the bushing orifices. Also, the temperature of the molten glass must remain constant to provide a constant viscosity of the molten glass, and thus a constant flow rate through the orifices. Therefore, the actual diameter of the continuously drawn fibers at any point or points along their length must be measured while they are being drawn so that one or more of the fiber forming factors can be adjusted to obtain the desired diameter.

One difficulty encountered in measuring the diameter of glass fibers is that the diameters are often extremely small, generally on the order of a few micrometers. The weakness of glass fibers to abrasion makes the measurement of fiber diameters difficult, because any action to measure the fibers generally requires that the fibers be restrained or held in some fashion during the measurement. Therefore, contacting measurements do not lend themselves to the measurement of fiber diameters during the actual forming operation where the fibers are moving at extremely rapid rates which would cause abrasion damage.

Therefore, it is an object of this invention to provide a reliable and accurate method and apparatus for sensing the average fiber diameter of a plurality of fibers without contacting the fibers, such apparatus being responsive to small changes in the diameters of the fibers in order that the output of such apparatus can be used for measurement and/or control purposes.

SUMMARY OF THE INVENTION

In accordance with the present invention there is provided a method of monitoring the average diameter of a plurality of glass fibers, such method comprising the steps of illuminating the fibers with electromagnetic radiation, sensing radiation scattered by the fibers and generating a signal responsive to the amount of radiation sensed as an indication of the average diameter of the fibers. Preferably, the electromagnetic radiation is a beam of substantially monochromatic light.

In addition, the invention provides a glass fiber producing apparatus comprising: a feeder for holding a molten body of thermoplastic material, such feeder having an orificed wall for emitting a plurality of streams of such material; a rotary collector for attenuating the streams into continuous fibers and for winding the fibers into a package; a gathering device located between the feeder and winder for gathering the fibers into a strand before being wound into the package; means for illuminating the fibers with electromagnetic radiation; means for collecting electromagnetic radiation scattered by the fibers; and means responsive to the collected scattered electromagnetic radiation for generating an electrical signal indicative of the average diameter of the fibers. The feeder is conventionally electrically heated and may comprise a control means for controlling the amount of electrical power supplied thereto. The rotary collector may comprise a means for controlling the speed thereof, and the apparatus may further comprise a means for controlling the environment below the feeder. Preferably, the apparatus comprises means for averaging the generated signal over time and means for comparing the averaged signal with a reference signal indicative of the desired average diameter for generating an error signal, and such comparing means is in communication with either the feeder control means, winder control means, or environmental control means for providing the error signal to one or any combination of the three control means for varying the fiber forming process to obtain uniform average fiber diameters.

The system of the present invention is well adapted to the fiber forming environment which includes large radiative heat loads from the orificed wall, moisture from prepared sprays and periodic cleaning, binder solids entrained in air circulating around the feeder or bushing, shock- vibration loads due to bushing changes, and similar adverse environmental factors. Moreover, the system does not interfere with normal bushing operation and operator access to the bushing.

In a preferred embodiment, a calibration element is combined with an electro-optical measurement instrument to provide a system having automatic compensation of the entire electro-optical train without interruption of the measurement process for monitoring the average diameter of fibers produced in a fiber forming process. The electro-optical instrument includes a plurality of light-emitting-diodes which provide a source of substantially monochromatic electromagnetic radiation and optics for collection and focusing radiation onto a detector. The radiation is directed through a sampling volume where it impinges upon the fibers whose diameters are to be measured by scattering techniques. The calibration element is rotatably positioned in the path of the electromagnetic radiation, optically upstream of the sampling volume, such that the radiation is periodically blocked and sampled.

Although, the present invention is described herein in a backscattering embodiment, it should be understood that the novel aspects of the invention have much broader application and may be applied to forward and side scattering systems for the measurement of glass fibers.

Other objectives, advantages and applications of the present invention will be made apparent by the following detailed description of the preferred embodiments of the invention.

DETAILED DESCRIPTION OF THE PREFERRED EMBODIMENTS

Figure 1:
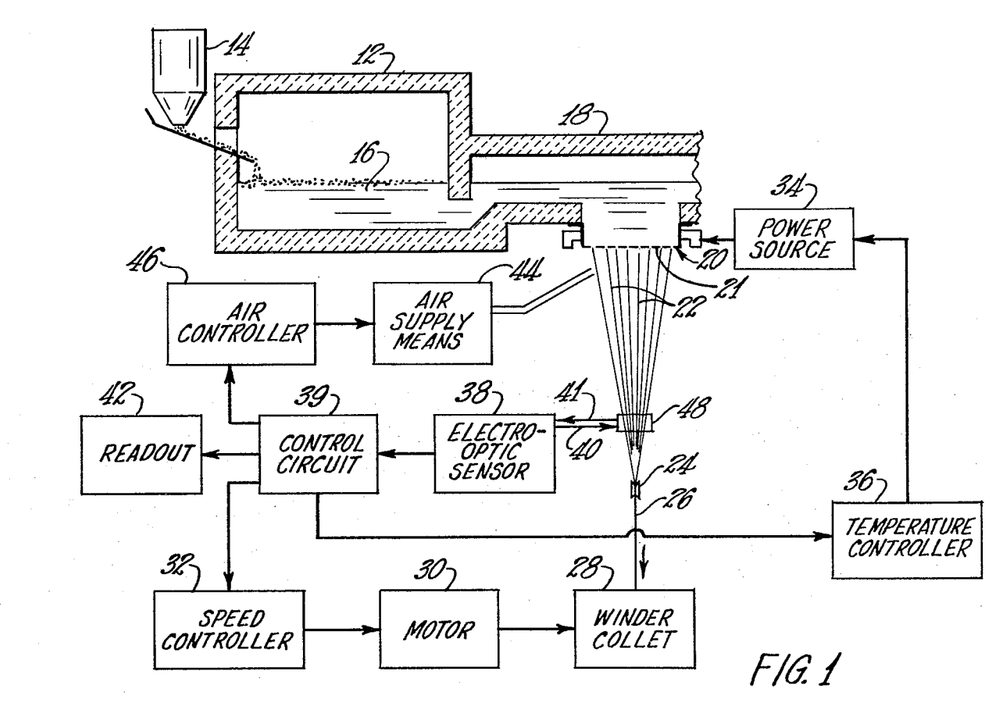
FIG. 1 is a schematic block diagram showing the incorporation of the present invention into an apparatus for producing a plurality of glass fibers or filaments.

FIG. 1 shows the incorporation of the present invention into an apparatus for producing a plurality of glass fibers or filaments. In a typical fiber forming process, raw materials or batch are provided to a melting furnace 12 by suitable supply means 14 at a rate which is sufficient to maintain the mass flow rate of molten glass 16 being extracted and flowed along forehearth 18 to a fiber forming feeder or bushing 20. From bushing 20, molten glass 16 flows into a plurality of streams through a grid of orifices 21 formed in the bottom of bushing 20, such orifices may have projecting tips or may be tipless. Normally, bushing 20 is electrically heated to control the temperature, thereby controlling the viscosity of the issuing streams of molten glass. The streams of molten glass issuing from orifices 21 are pulled at a high rate of speed for attenuation into individual fibers 22. Attenuated fibers 22 pass downwardly in a generally conical pattern to a gathering member 24 which forms strand 26. Gathering member 24 also may supply a suitable sizing fluid to strand 26 in the known manner, or a separate applicator means may be employed. From gathering member 24, strand 26 moves to a winder collet 28 where it is wound on a collection tube to form a package. Winder collet 28 is driven by a motor 30 or any other suitable means and, generally, the speed of motor 30 is regulated by a speed controller 32.

A temperature controller 36 regulates the amount of electrical energy provided by power source 34 to heat bushing 20, thereby maintaining bushing 20 at a predetermined temperature. The environment beneath bushing 20 is controlled by an air supply means 44 which is positioned beneath bushing 20 for controlling the temperature and airflow, e.g., Thompson, U.S. Pat. No. 4,202,680, which is assigned to the assignee of the present invention. An air controller 46 is connected to air supply means 44 to control the amount of air provided by air supply means 44. Alternatively, the temperature beneath the bushing may be controlled by a finshield arrangement, as disclosed in Russell, U.S. Pat. No. 2,908,036, such arrangement also including a controller for controlling the rate at which the cooling fluid passes through the finshield arrangement. Still further, means may be provided for automatically adjusting the position of the finshields themselves.

Electro-optic sensor 38 is positioned between bushing 20 and gathering member 24 such that its emitted beam of light 40, falls upon a representative, unsized fiber sample in the electro-optically defined sampling volume 48. Emitted light 40 is backscattered from fibers 22 and a portion thereof, which is indicated generally by numeral 41, is collected by sensor 38. Sensor 38 is connected to a control circuit 39 which, in turn, may be connected to an apparatus 42 for readout, display or storage of the average fiber diameter. For control purposes the output of control circuit 39 is provided to speed controller 32 to vary the winding speed of winder 28, or to temperature controller 36 to vary the temperature of bushing 20, or to air controller 46 to vary the amount of air provided beneath bushing 20, or any combination thereof.

Figure 4:
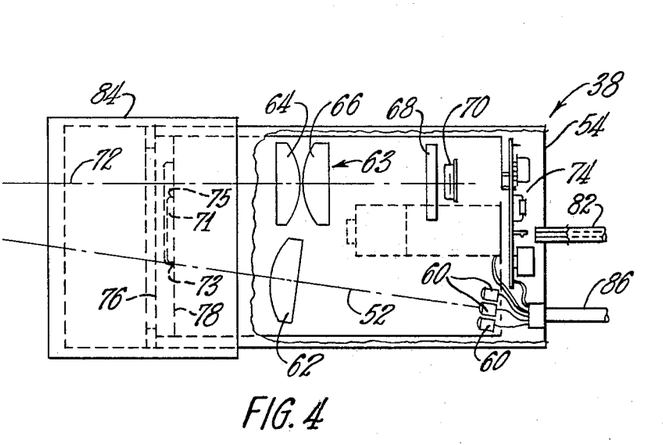
FIG. 4 is a detailed plan view of an apparatus for use with the present invention.
Figure 5:
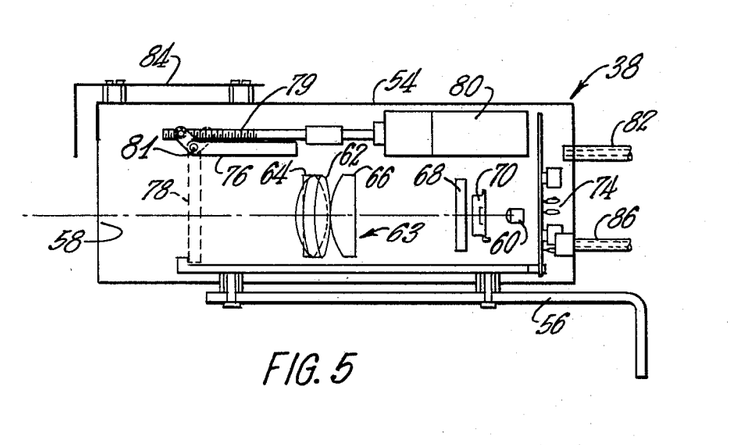
FIG. 5 is a detailed view in elevation of the apparatus shown in FIG. 4.

Sampling volume 48 is defined as the joint intersection of the emitted beam of light and the radiation collection optics according to the following equation:

$$I \cdot W = \text{constant}$$

where I is the LED beam intensity in watts/square centimeter and W is the solid angle of reception in steradians. Both I and W are dependent on position relative to the optical system. In essence, sampling volume 48 is that region of space where light from the LED source (numeral 60 in FIGS. 4 and 5) may both fall on fibers 22 and be received by the collection optics (numeral 63 in FIGS. 4 and 5).

Figure 2:
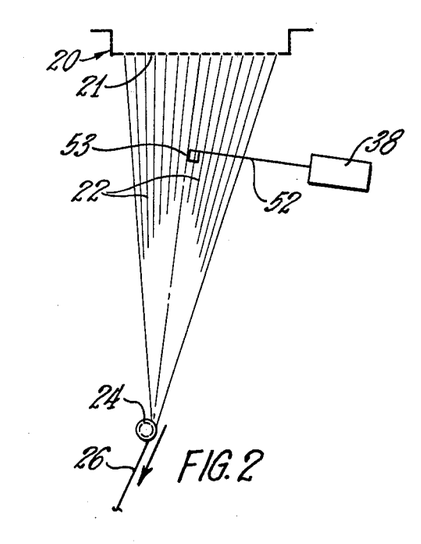
FIG. 2 is a diagrammatic view showing the preferred orientation according to the present invention of a sensor relative to the longitudinal axis of the fibers.

With reference to FIG. 2, the angle between the line of illumination 52 and the fibers of interest 22 should be adjusted so that a maximum amount of light backscattered from preferred fibers will reach the collection optics and be utilized in the diameter measurement. The amount of emitted light 52 reaching the collection optics is maximized when sensor 38 is tilted on its axis such that emitted light 52 is incident perpendicularly upon the center 53 of the fibers in the preferred part of the fan. Generally, the fibers which are located in the central area of the bushing are preferred, since the fibers located at the periphery are more readily influenced by normal changes in bushing power and changes in the ambient environment.

It has been found that a reasonable compromise between complexity, expense and coverage of the entire bushing is to use a representative sample of the fibers from bushing 20 such that approximately 10% of the fibers are within sampling volume 48. However, this percentage is given by way of example and not in a limiting sense. In addition, it should be noted that the present invention may be utilized to monitor the average diameter of a single fiber.

Figure 3:
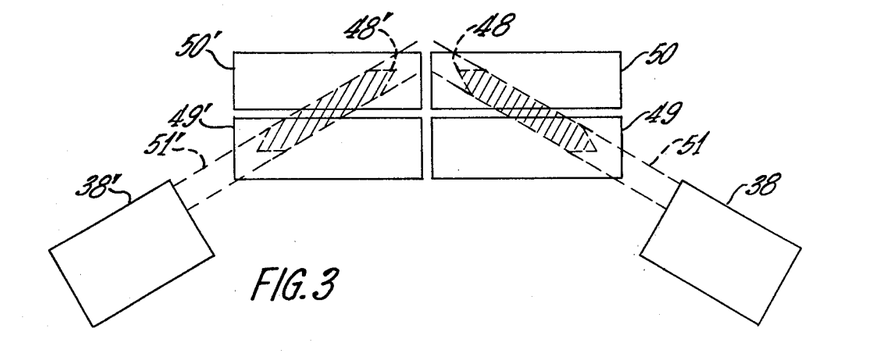
FIG. 3 is a diagrammatic view showing the orientation of two sensors to a single bushing.

FIG. 3 illustrates a typical installation of two electro-optic sensors 38 and 38' on a single bushing where more than one package is wound simultaneously on a single winder, e.g., U.S. Pat. No. 3,897,021. The fiber fan outline approximately 12" below the tip plate of the bushing for the right front quarter of the bushing, as viewed in FIG. 3, is indicated by numeral 49. The fiber fan outline for the right rear quarter of the bushing is indicated by numeral 50. Similarly, for the left side of the bushing the fiber fan outline for the front and rear quarters are indicated by numerals 49' and 50' respectively. Sensor 38 provides a beam of light 51 which illuminates a portion of the fibers in quarters 49 and 50 and defines sampling volume 48. Sensor 38' provides a beam of light 51' to the left half of the bushing, illuminating a portion of the fibers in quarters 49' and 50' and defines sampling volume 48'. The signals from sensors 38 and 38' are provided to control circuit 39 (FIG. 1) for proper correlation and utilization in controlling the fiber forming process, as described in detail below. If desired, more than one sensor 38 may be used for a single bushing even if only a single package is being wound from the fibers supplied by that bushing, thereby monitoring a larger cross section of the fibers in the fan. The individual signals may then be correlated and used to control the fiber forming process as discussed hereinafter. The angular orientation of sensors 38 and 38', which is illustrated in FIG. 3, allows the sensors to collect backscattered light from the largest number of fibers since a minimal amount of shadowing of the fibers occurs in this orientation.

FIGS. 4 and 5 illustrate one embodiment of electro-optic sensor 38 for use with the present invention from a top view and side view, respectively. Sensor 38 has a housing 54 which is attached by suitable fasteners to mounting plate 56 which, in turn, is mounted in any suitable position adjacent the fiber fan. A quantity of light, indicated by numeral 52, is generated by three light-emitting diodes 60; light 52 from light-emitting diodes 60 is focused into a substantially collimated beam by plano-convex lens 62 after which it exits from housing 54 through aperture 58. Lens 62 is positioned so that its flat side is closest to diodes 60. The collimated beam of monochromatic light may also be generated by a laser or other suitable device. The wavelength of the monochromatic light emitted by diodes 60 may be, for example, 0.9 microns. However, it should be understood that the beam may contain more than one wavelength, in which case, the wavelength or wavelengths of interest would be separated from the collected radiation by conventional filtering techniques.

All of the light backscattered from the fibers that passes through a predetermined zone, i.e., collection optics 63, such light being indicated by numeral 72, is detected. Collection optics 63 which comprises plano-convex lenses 64 and 66, positioned such that their convex sides are adjacent, focuses the backscattered light, after which it passes through an infrared filter 68 onto photodetector 70. The amount of backscattered light received by photodetector 70 is dependent upon the axial response of the system which is related to the focal length of collection optics 63 and the distance of sensor 38 from fibers 22. In the preferred embodiment, the diameter of lens 64 is chosen from the approximate formula which specifies that the arc tangent of the diameter (D) of lens 64 divided by the distance (d) from a plane through the center of lens 64 to the center of sampling volume 48 is greater than or equal to 5° (arc tan $D/d \geq 5°$). The output of photodetector 70 is fed to a preamplifier which is part of electrical circuit 74; circuit 74 also contains a driver circuit for diodes 60.

A calibration element 76 is pivotably mounted on pivotal axis 81 such that it can be moved into a closed position indicated by the dotted lines at numeral 78 so that a calibration of the electro-optic portions of sensor 38 can be performed at predetermined intervals. Calibration element 76 is moved into and out of its closed position by screw drive mechanism 79, which is driven by motor/gearhead 80. Calibration element 76 contains fiber optics 71 with ends 73 and 75. The operation of calibration element 76 is discussed hereinafter in detail.

An air hose or coupling 82 supplies air into housing 54 from an air supply (not shown) for blowing dust particles and the like away from the collection or viewing aperture 58 and for cooling electronic circuit 74 to prevent drift. Sensor 38 is also provided with an L-shaped heat shield 84 to protect it from the heat radiated from the tip plate of bushing 20. Heat shield 84 is attached to the top front part of housing 54 by suitable fasteners such that the short leg of L-shaped heat shield 84 is located in front of housing 54 above aperture 58.

Figure 6:
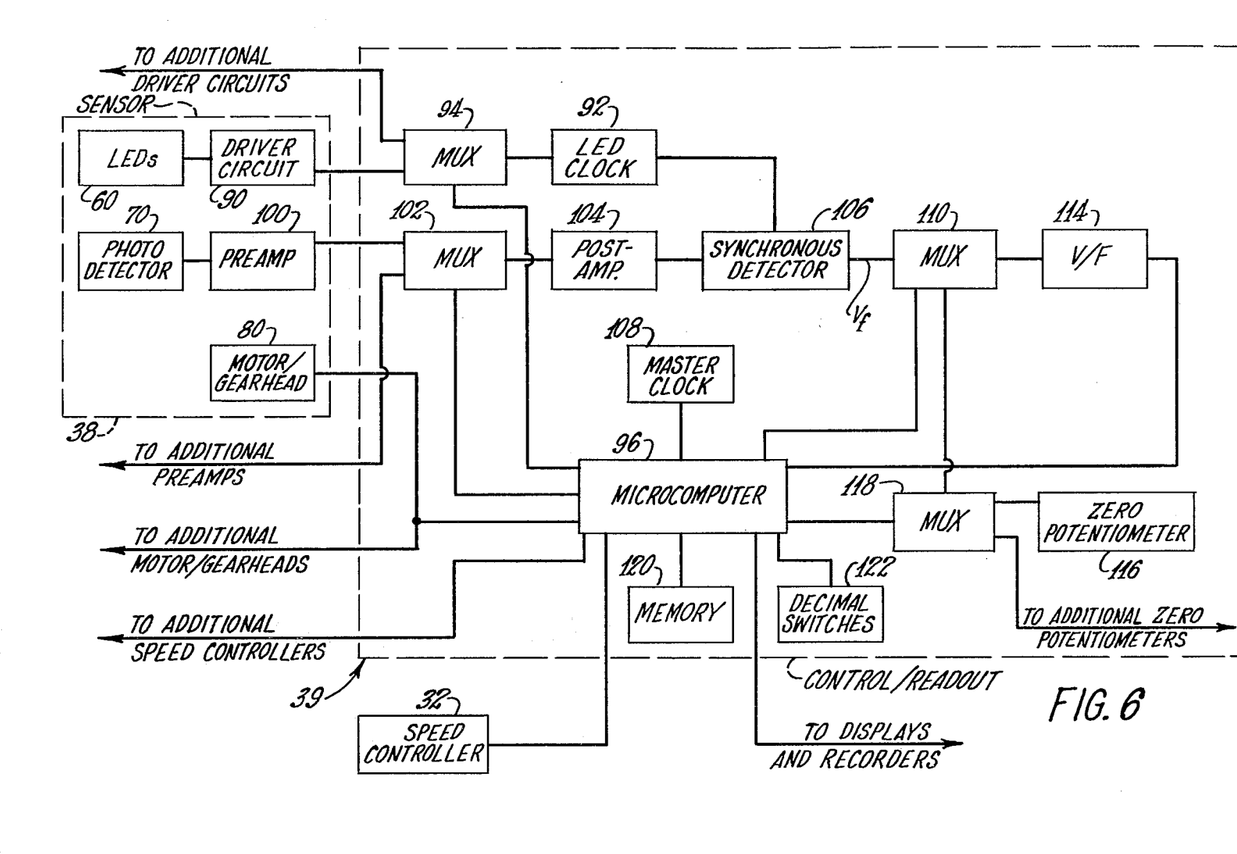
FIG. 6 is a schematic block diagram showing a control system according to the present invention in a microcomputer based system.

With reference to FIG. 6, the signal processing from sensor 38, including how the automatic compensation of gain and zero is implemented by control system 39 in a microcomputer based system, is explained. LEDs 60 are excited by driver circuit 90, which, in turn, is actuated by signals from LED clock 92. The signals from clock 92 reach driver circuit 90 via analog multiplexing switch 94, which is under the control of microcomputer 96. Multiplexing switch 94 may also be connected to other LED driver circuits. Radiation from LEDs 60 is collected by beam forming lens 62, whence it falls upon a representative fiber sample in the electro-optically defined sampling volume 48. Backscattered radiation is received by collection optics 63, passed through infrared filter 68 and focused on photodetector 70. The low level output signal from photodetector 70 is amplified by preamplifier 100 and supplied to multiplexing electronic switch 102 which receives its control signal from microcomputer 96. Multiplexing switch 102 may also be connected to other preamplifiers. Multiplexing switch 102 is connected to postamplifier 104 in which the signal is further amplified and then provided to synchronous detector 106. Clock 92 and synchronous detector 106 are operated in synchronism, as is well known in the art, to permit more reliable signal processing, particularly for low level signals in the presence of high, quasi-static background radiation, such as that found in the vicinity of a luminous bushing.

Synchronous detector 106 filters and applies DC offsets to the signal and provides an output signal, symbolized by $V_f$, to analog multiplexing switch 110 which is under the control of microcomputer 96. Signal $V_f$ is in direct proportion to the mean fiber diameter of the plurality of representative fibers in sampling volume 48. When the output terminal of multiplexing switch 110 is connected to synchronous detector 106, by proper logic from microcomputer 96, $V_f$ is inputted to voltage to frequency converter 114 (V/F converter 114). V/F converter 114 produces an output signal whose frequency is in direct proportion to the analog voltage inputted, this form being optimum for digital processing, as is well known and understood by those skilled in the art.

Signal $V_f$ is compensated for zero and gain variations of the electro-optical system to ensure accurate and reliable results. The variations in the gain of the electro-optical transfer functions can be caused by numerous factors, for example, if the quantity of light produced by the LEDs is reduced by a factor of two, then it follows that the net signal $V_f$ will also be reduced by a factor of two. The gain may also vary if the collection optics are contaminated by foreign matter. For example, if only fifty percent of the light falling upon the collection optics is transmitted, then it follows that the net signal $V_f$ would be reduced by a factor of two. The zero or baseline signal of the system, $V_b$, i.e., the value of $V_f$ when all of the representative fibers in sampling volume 48 are completely removed and no material is inserted in their place, may not reliably approach a true zero voltage but rather some background signal. The origin of $V_b$ may be stray light, ambient light or electromagnetic pickup of any kind.

$V_b$ has been found to be both small and fairly constant and can be made to approach zero by utilizing zero potentiometer 116, which is connected to multiplexing switch 110 by analog multiplexing switch 118 which is under the control of microcomputer 96. Multiplexing switch 118 may be connected to additional zero potentiometers. If $V_b$ should change, it is a simple matter to adjust zero potentiometer 116 so that $V_f$ approaches zero when the fibers to be measured are removed.

The compensation for electro-optical system gain is accomplished by periodically rotating calibration element 76 downward to its closed position 78. Referring to FIGS. 4 and 6, the mechanical operation of calibration element 76 is accomplished by exciting motor/gearhead 80 which, in turn, operates a screw drive mechanism 79 such that calibration element 76 is operated around pivotable axis 81. Motor/gearhead 80 is driven by a signal provided by microcomputer 96. Microcomputer 96 may also provide actuation signals to additional motor/gearheads.

When calibration element 76 is in its closed position 78, the beam of light from LEDs 60 falls on end 73 of fiber optics 71. A precisely known fraction of the incident radiation then emanates from the other end 75 of fiber optics 71, to collection optics 63. The radiation then passes through filter 68 onto photodetector 70 which generates an electric signal. The signal proceeds along the same signal path as a normal signal from the representative fibers in sampling volume 48. Thus, it is evident that the entire electro-optical transfer function is used so that variations in any component are determined and ultimately compensated.

The signal $V_f$ that is inputted to V/F converter 114 is derived from three conditions: (1) a true signal from representative fibers; (2) a zero signal when no fibers are present; and (3) a calibration signal. All of the signal conditions are produced under the control of microcomputer 96 in accordance with a program determined by program and scratch pad memory 120.

The mathematical operation of automatic compensation of the transfer function implemented by microcomputer 96 to produce an automatically-compensated indication proportional to mean fiber diameter can be generally expressed as follows:

$$V_f' = (V_f - V_b) \frac{V_{ref}}{V_{cal}} \qquad (1)$$

where $V_b$: signal with no fibers present;

$V_{cal}$: signal with calibration element 76 in closed position 78;

$V_f$: total signal from representative fibers in sampling volume 48;

$V_{ref}$: scaling or multiplying signal; and $V_f'$: final, compensated signal which is proportional to mean fiber diameter.

Clearly, the operation of the apparatus of the present invention in implementing equation (1) is to acquire the total signal $V_f$, subtract off the background $V_b$, multiply by a signal $V_{ref}$, and then divide by the calibration $V_{cal}$. $V_b$ is a reference signal derived from control potentiometer 116 to make the readings of sensor 38 agree with separately determined calibration values. Evidently, if the transfer function were reduced by a factor of 50%, then the net signal $V_f$ minus $V_b$ would have been reduced by a factor of 2. However, dividing by the calibration signal $V_{cal}$ results in $V_f'$ indicating the same response to the representative fibers in sampling volume 48 as when the transfer function is at its original value.

Microcomputer 96 averages $V_f'$ over time to minimize the effects of any transient aberrations in a fiber or fibers, thereby providing a more meaningful signal, $V_{out}$, for control purposes. By averaging $V_f'$ over time, the average diameter of the plurality of fibers is derived from multiple replications of measurements along the lengths of the fibers.

It has been found that calibration updating of the sensor of approximately once per hour is satisfactory to control the electro-optic transfer function to very precise levels. The initiation of the calibration update is under microcomputer control and in some embodiments takes place at hourly intervals; however, there are other protocols under which the calibration update may be implemented as explained hereinbelow.

Microcomputer 96 provides $V_{out}$ for control of the winder speed. Microcomputer 96 may also provide $V_{out}$ in either analog or digital form to typical panel meters, chart recorders or a plant computer for annunciation, process control and archival storage. These utilizations of the signal $V_{out}$ are well known to those skilled in the art and are served by way of illustration and not limitation.

The multiplexing functions provided by the various multiplexing switches allow microcomputer 96 to process signals from a plurality of sensors at a single bushing, or a plurality of sensors monitoring a plurality of bushings with one or more sensors monitoring each bushing.

Operator access to control of the microcomputer functions is provided through decimal switches 122. Switches 122, in essence, instruct the various subroutines of microcomputer 96 to compute the desired parameter and present it at the desired input/output port. For example, codes may be entered through switches 122 which cause microcomputer 96 to present a signal corresponding to mean fiber diameter at a panel display or, simply by entering another code, the computations may be placed in terms of yardage for a specific bushing design.

As described above, numerous factors, such as winder speed control, bushing temperature control, and environmental control beneath the bushing, can be utilized to vary the diameter of the fibers being produced. Winder speed control is employed herein as an example of the incorporation of the electro-optical apparatus of the present invention into a fiber forming process; however, such should not be considered as a limitation since control of any one or combination of the fiber forming factors may be employed with the present invention to obtain fibers of uniform diameter.

Referring again to FIG. 1, the electro-optical system of the present invention is incorporated into a fiber forming process as follows. Sensor 38 emits a beam of light 40 towards fibers 22 in sampling volume 48; the light impinging upon such fibers is backscattered, indicated generally by numeral 41, and a portion thereof is collected and focused on a photodetector in sensor 38. Sensor 38 then provides a signal to control circuit 39 which manipulates the signal as described above and provides a signal indicative of the mean fiber diameter to speed controller 32. Winder collet 28 is directly connected to a variable speed motor 30 whose speed is controlled by speed controller 32. If the mean fiber diameter is too large, sensor 38 produces a signal $V_f$ that is larger than normal; such signal produces an error signal in speed controller 32. Speed controller 32 utilizes the error signal to increase the speed of motor 30 which results in an increased strand speed causing a reduction in the mean fiber diameter, such that ultimately, $V_f$ will exactly match a preset reference signal within speed controller 32. The mean fiber diameter is thus controlled by achieving a constant $V_f$. Similarly, if the mean fiber diameter is too small, sensor 38 would produce a $V_f$ that is smaller than normal; such signal produces an error signal in speed controller 32 so that speed controller 32 decreases the speed of motor 30 resulting in a decreased strand speed and hence an increase in the mean fiber diameter.

In a typical fiber forming operation, winder collet 28 is brought up to speed after initiation by an operator or by winder speed controller 32. At this point, control is shifted to control circuit 39 so that after a brief settling transient, glass of constant mean fiber diameter is wound onto the package. When a predetermined amount of time or, better, weight of glass has been wound onto the package, the run is terminated. At this point, while the new collection tube is being brought into position and a new run started, control circuit 39 receives a signal either from an operator, or from speed controller 32, to go through an automatic calibration. When the calibration is finished, control again is given to control circuit 39 for making glass of constant mean fiber diameter. If desired, a protocol may be employed to send the sensor into an automatic calibration, when for any reason the fiber forming process is upset such that yardage of nominal value can no longer be made. This protocol will provide the advantages of protecting the internal elements of sensor 38 during the correction of the problem causing the upset and allowing sensor 38 to utilize downtime for performing the calibration of the transfer function rather than during normal operation.

Figure 7:
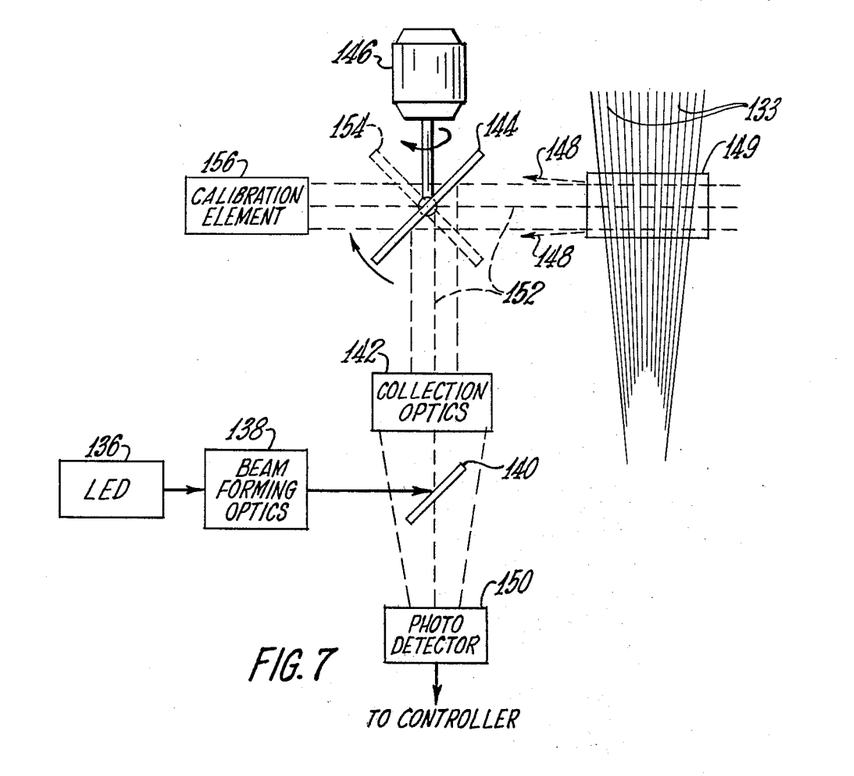
FIG. 7 is a diagrammatic view of an apparatus for use with the present invention that scans the fibers to be monitored.
Figure 8:
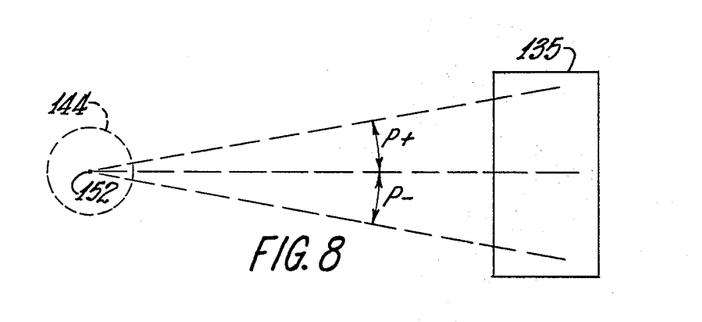
FIG. 8 is a diagrammatic plan view of the apparatus shown in FIG. 7 illustrating the angular orientation of the scanning.

In another embodiment, which is shown diagrammatically in FIGS. 7 and 8, the sensor scans across fibers 133 of an entire bushing, or, if desired, half of a bushing, and generates a signal more representative of 100% of the fibers. The outside dimensions of the bushing are shown in FIG. 8 by numeral 135. LED 136 provides a quantity of light that is formed into a beam by beam forming optics 138 and brought to bear on beam mirror 140. Beam mirror 140 transmits the beam through collection optics 142 onto scanning mirror 144 which is driven at a rate of about one revolution per second by a small motor 146 and may be tilted in either one of two positions. Scanning mirror 144 transmits the beam to fibers 133, and backscattered radiation 148 from fibers 133 within sampling volume 149 proceeds coaxially backward to scanning mirror 144 through collection optics 142 onto photodetector 150. The signals generated by photodetector 150, as scanning mirror 144 sweeps the beam across fibers 133, are then synchronously detected and processed by the microcomputer, as described hereinabove.

The sensor produces a signal that is a function of the scan angle, which is contained within the limits of $\pm P$ (FIG. 8), as defined by the size of mirror 144, the angle of tilt thereof and the distance therefrom to fibers. The signal produced by the sensor is also a function of the fiber axes relative to optical axis 152 of the sensor, as discussed hereinbefore. The response of the sensor can be restricted so that a response from preferred fibers may be generated, i.e., by proper combination of optical parameters for the sensor and bushing parameters it is possible to approximately resolve front and rear halves of a bushing. This front half/rear half resolution is accomplished by tilting scanning mirror 144 about an axis perpendicular to optical axis 152.

When scan mirror 144 has reached the position indicated by numeral 154, the beam impinges upon calibration element 156 from which a precisely known fraction of the incident radiation emanates to scan mirror 144 and then through collection optics 142 onto photodetector 150 for compensation of the transfer function, as discussed above. An electro-optic sensor provides a signal to the controller (control circuit 39 in FIG. 1) to indicate that scan mirror 144 is in its calibrate position 154, thereby causing the microcomputer to enter its calibration routine. Other means can be used for detecting when scan mirror 144 is in its calibration position 154, such as, for example, a microswitch responsive to the position of the shaft of motor 146.

In alternative embodiments, the sensor may scan the sampling volume by pivoting or rotating about an axis, or it may move linearly along the bushing, such as on a conventional pair of rails or tracks.

It is to be understood that variations and modifications of the present invention may be made without departing from the scope of the invention. It is also to be understood that the scope of the invention is not to be interpreted as limited to the specific embodiment disclosed herein, but only in accordance with the appended claims when read in the light of the foregoing disclosure.

We claim:

1. A method of controlling the average diameter of a plurality of glass fibers, said method comprising the steps of:
    (a) illuminating a predetermined portion of said fibers in a fiber fan with electromagnetic radiation;
    (b) sensing all of the electromagnetic radiation scattered backwards from said fibers which passes through a predetermined reflection zone;
    (c) generating a first signal, $V_f$, responsive to the amount of electromagnetic radiation sensed when the fibers are present;
    (d) generating a second signal, $V_b$, responsive to the amount of electromagnetic radiation sensed when no fibers are present;
    (e) generating a third signal, $V_{cal}$, by means of a calibration device which interconnects the electromagnetic illuminating device of (a) above and the electromagnetic radiation sensing device of (b) above;
    (f) inputting a fourth signal, $V_{ref}$, by suitable exterior switching devices;
    (g) using a microcomputer to generate a fifth signal, $V_f$, from the above signals one through four based upon the equation:

$$V_f = (V_f - V_b) \frac{V_{ref}}{V_{cal}}$$

which is an indication of the average diameter of said fibers;
    (h) comparing this fifth signal by means of the microcomputer to a previously stored sixth signal to produce an error signal which is indicative of a change in fiber diameter;
    (i) using the error signal by means of the microcomputer located in the control circuit to control a fiber forming process for producing said glass fibers in order to maintain the diameter of the fiber constant by maintaining signal number five, $V_f$, constant.

2. A method as recited in claim 1, wherein the electromagnetic radiation of step (a) is a monochromatic light source.

3. A method as recited in claim 1, wherein said control of the average diameter of a plurality of glass fibers is performed in a fiber forming process and said method further comprises averaging said first signal over a time interval to form a new first signal; comparing said new first signal with the remainder of the signals as recited in claim 1 to generate a signal, $V_f$, indicative of the desired average diameter of the plurality of strands in the fiber fan; comparing signal, $V_f$, with a reference signal to produce an error signal; and using said error signal to modify the fiber forming process to maintain the average diameter of the fibers at a predetermined magnitude.

4. An apparatus for producing glass fibers, said apparatus comprising:
    (a) a feeder for holding a molten body of thermoplastic material;
    (b) said feeder having an orificed bushing for emitting a plurality of streams of said thermoplastic material;
    (c) a means for heating said bushing;
    (d) a means for controlling the environment around the plurality of streams of said thermoplastic material below said bushing;
    (e) a rotary collector for attenuating said streams into continuous fibers and for winding said fibers into a package;
    (f) a gathering device located between said feeder and collector for gathering said fibers into a strand before being wound into said package;
    (g) means for illuminating a predetermined portion of the fan of said fibers with electromagnetic radiation;
    (h) means for collecting all of the electromagnetic radiation scattered backwards by said fibers that passes through a predetermined reflection zone;
    (h) means responsive to said collected scattered electromagnetic radiation for generating a first signal, $V_f$, indicative of the magnitude of the electromagnetic radiation collected when fibers are present;
    (i) means responsive to said collected scattered electromagnetic radiation for generating a second signal, $V_b$, indicative of the magnitude of the electromagnetic radiation collected when no fibers are present;
    (j) calibration means for shunting a portion of the illuminating electromagnetic radiation directly to the collecting means for generating a third signal, $V_{cal}$, indicative of the internal response of the electromagnetic transmitting and receiving means;
    (k) means for enclosing, thermally shielding and air cooling the electromagnetic radiation illuminating means, the calibration means, the electromagnetic collection means and their associated mechanical, electrical, and electronic components;
    (l) means for manually inserting a fourth signal, $V_{ref}$, by suitable switching devices;
    (m) a microcomputer with associated input and output devices for receiving the four above signals, for calculating a fifth signal, $V_f$, by means of the formula $$V_f = (V_f - V_b) \frac{V_{ref}}{V_{cal}}$$

for comparing this signal to a previously determined sixth signal which is stored in the memory of the microcomputer to produce an error signal; and
    (n) control means associated with said microcomputer for using the error signal to adjust the power input to the bushing and/or adjust the speed of the rotary collector and/or adjust the environment around the bushing in response to the error signal to reduce the error signal to zero thus maintaining the average diameters of a plurality of strands of thermoplastic material constant.

5. An apparatus as recited in claim 4, wherein said electromagnetic radiation is a collimated beam of substantially monochromatic light, said collecting means focuses the collected scattered light onto said signal generating means and said signal generating means comprises a photodetector means responsive to the amount of scattered light focused thereon for generating said first signal and means for integrating said first signal over time to provide a second signal.

6. An apparatus as recited in claim 4, wherein said collecting means comprises means for collecting electromagnetic radiation backscattered by said fibers.

7. An apparatus as recited in claim 4, wherein said collecting means comprises means for collecting electromagnetic radiation side scattered by said fibers.

8. An apparatus as recited in claims 5, 6 or 7, wherein said apparatus further comprises: a first means responsive to said error signal for modifying the set point temperature of said feeder; a second means responsive to said error signal for modifying the set point speed of said rotary collector; a third means responsive to said error signal for modifying the environment below the feeder by moving fin shields or directing columns of air beneath the feeder; and means for comparing said error signal with a reference signal indicative of the desired average diameter of the plurality of strands, said comparing means being in communication with at least one of said first second, and third means to modify the feeder temperature, the rotary collector speed, or the environment under the feeder so that the average diameter of said fibers being produced is maintained at said desired average diameter.

9. An apparatus as recited in claim 4, wherein said apparatus further comprises means for causing said beam to sweep across said fibers.

10. An apparatus for producing glass fibers, said apparatus comprising: a feeder for holding a molten body of thermoplastic material, said feeder having an orificed wall for emitting a plurality of streams of said material; a rotary collector for attenuating said streams into continuous fibers and for winding said fibers into a package; a gathering device located between said feeder and collector for gathering said fibers into a strand before being wound into said package; a source of electromagnetic radiation; means for directing a beam of radiation from said source through a portion of said fan of fibers; photodetector means having a photosensitive means for producing electronic detection signals systematically related to the amount of electromagnetic radiation falling on said photosensitive means; optical means for directing upon said photosensitive means electromagnetic radiation from an optically defined sampling region of the portion of said fan of fibers traversed by said beam, which region contains many of said fibers; and indicator means responsive to said electronic detection signals for indicating the average fiber diameter of the fibers being produced.

11. An apparatus as recited in claim 10, wherein said apparatus further comprises a calibration control means disposed between said sampling region and said optical means for blocking said beam and periodically redirecting a predetermined fraction of said beam onto said optical means such that said signal includes a plurality of time varying signal components, including a calibration signal component and a measurement signal component.

12. An apparatus as recited in claim 11, wherein said apparatus further comprises: a first means responsive to a first signal for modifying the set point temperature of said feeder; a second means responsive to a second signal for modifying the set point speed of said winder; and means for comparing said measurement signal component with a reference signal indicative of the desired average diameter to generate an error signal, said comparing means being in communication with at least one of said first and second means for providing said error signal thereto to modify the respective signal so that the average diameter of said fibers being produced is maintained at said desired average diameter.

13. An apparatus for producing glass fibers, said apparatus comprising: a feeder for holding a molten body of thermoplastic material, said feeder having an orificed wall for emitting a plurality of streams of said material; a rotary collector for attenuating said streams into continuous fibers and for winding said fibers into a package; a gathering device located between said feeder and collector for gathering said fibers into a strand before being wound into said package; a source of electromagnetic radiation; optical means for directing a beam of said radiation through a sampling volume for impingement upon the fibers; a receiver optics assembly including photodetector means responsive to said radiation for developing a signal representative of radiation directed onto said detector means and optical means for collecting and directing radiation from said sampling volume traversed by said beam, and calibration control means disposed between said sampling volume and the optical means for blocking said beam and periodically redirecting a predetermined fraction of said beam onto said optical means such that said signal includes a plurality of time varying signal components including a calibration signal component and a measurement signal component.

14. An apparatus as recited in claim 13, wherein said calibration control means comprises a rotatable element positioned in the path of said electromagnetic radiation.

15. An apparatus as recited in claim 13, wherein said apparatus further comprises: a first means responsive to a first signal for modifying the set point temperature of said feeder; a second means responsive to a second signal for modifying the set point speed of said winder; and means for comparing said measurement signal component with a reference signal indicative of the desired average diameter to generate an error signal, said comparing means being in communication with at least one of said first and second means for providing said error signal thereto to modify the respective signal so that the average diameter of said fibers being produced is maintained at said desired average diameter.

16. A method as recited in claim 1, wherein the control of the fiber forming process of step (i) comprises:
(a) varying the power supplied to a glass fiber forming bushing;
(b) varying the speed of a fiber winding apparatus; and
(c) varying the position of bushing finshields or the quantity of air supplied to the bottom of the bushing in order to adjust the environment directly below the bushing.

* * * * *